May 5, 1959  W. J. TALLEY  2,885,241
PALLET FOR MOVING AND STORING CARDBOARD
Filed May 9, 1955

INVENTOR.
BY WALTER J. TALLEY
ATTORNEY.

United States Patent Office 2,885,241
Patented May 5, 1959

2,885,241

PALLET FOR MOVING AND STORING CARDBOARD

Walter J. Talley, Park Ridge, Ill., assignor to The Pure Oil Company, Chicago, Ill., a corporation of Ohio Application May 9, 1955, Serial No. 506,933

2 Claims. (Cl. 294—67)

The present invention relates to a pallet for moving and storing cardboard cases and more particularly to the structure of a pallet having a center support member or angle brace which is adapted at one end thereof to be engaged by a mechanical hook of a hand truck or mechanically operated truck for lifting, transportation and placement of the cases in piles, one upon the other.

The principal object of this invention is to provide a pallet in convenient form for moving and storing case goods and adapted to be handled by a mechanical lift truck.

This and other objects of the invention will be understood by reference to the drawings in which Figure 1 is a perspective view of the pallet showing the cardboard cases in dotted lines.

Figure 1:
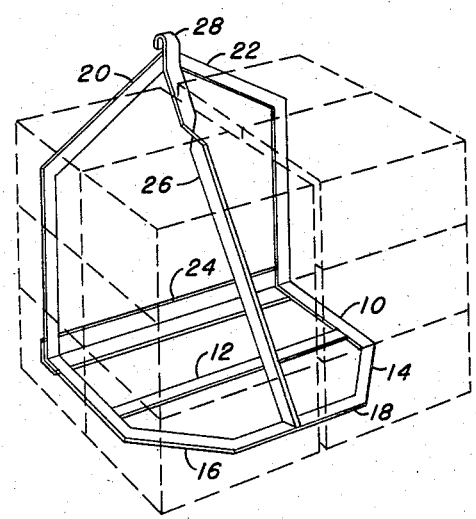

Referring to the drawings in more detail, the present device embodies a base member 10 forming a U-shaped bottom and cross braced by member 12. The corner portions of base member 10 are cut off as at 14 and 16 leaving a protruding edge 18 which may be beveled slightly so that a smooth edge is presented. Angle members 20 and 22 are fastened at their lower ends to the ends of base 10 to form the front supporting upright member of the pallet. The members 20 and 22 may be one piece and are joined to base 10 by welding at an angle of 90°. This angular junction is braced by member 24, which is an L-iron designed to present its internal flat surfaces against the bottom edges of the front boxes or cartons and also functional outer surfaces, the purposes of which are to be described. Member 24 may be an angle iron as shown in Figure 1 welded to members 20, 22 and 10. A center support member 26 connects between portion 18 of base member 10 and the upper middle portion of members 20 and 22 terminating in a hook 28 which is adapted to be engaged by the "alligator jaws" of a lift truck.

Figure 2:
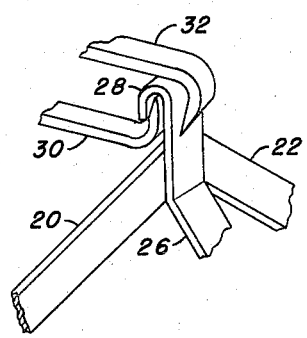
Figure 2 is a cut-a-way view showing the details of the hook for the lift truck.

The details of the manner in which the "alligator jaws" of a lift truck engage hook 28 are shown in Figure 2, with the jaws represented as members 30 and 32. These latter members do not form any portion of this invention and the operation of the lift truck and the alligator jaws is described in United States Patent 2,272,447 by C. E. Traxel. This and other forms of lift truck with engaging hooks may be used to lift, transport and stack the pallet of the present invention.

The center support 26 with its hook 28 serves several important functions in relation to this invention. First of all, the center support divides the cases (shown in dotted lines in Figure 1) in the center and spaces them so that they may be easily removed. This center support 26 in cooperation with front members 20 and 22, and base 10, serves as a supporting member against which and on which the cardboard cases may be stacked when loading the pallet. Center support 26 also serves as a weight carrying member keeping base member 10 and wall members 20 and 22 in rigid relationship to one another when the pallet is fully loaded and a lifting force is applied to hook 28. This pallet is particularly designed to hold cases of lubricating oil or canned goods which may weigh as much as 53 lbs. each. The twist in center support 26 to form the flat hook 28 occurs at a point between the cases so that they are slightly separated and can be easily grasped in unloading the pallet.

Figure 3:
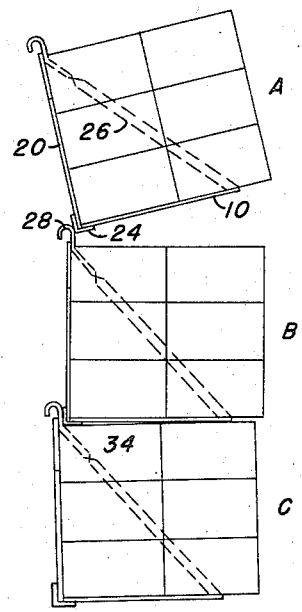
Figure 3 is a side view showing two loaded pallets in position and a third pallet being placed on top.

The top part of hook 28 is round or slanting and, as seen in Figure 3, serves as a sliding or guiding surface for brace 24 during the placement of one pallet upon another. In this operation it is seen that the hook of pallet B guides the top pallet A into position on pallet B by engaging the corner of angle iron brace 24 of pallet A as the latter is lowered thereupon.

Another feature of the pallet of this invention is that the bottom of cross brace 24 extends under the base member 10 so that when one pallet is placed upon the other this portion rests upon the top cases as corner case 34 of pallet C in Figure 3. This raises the aisle side of the stack of pallets and causes the stack to lean slightly toward the wall side insuring stability of the tier of pallets. It is to be observed that cross brace 12 is positioned in base member 10 so that its width overlaps the edges of two adjoining cases in such a manner that they are equally supported thereby. Likewise, the inwardly extending bottom edge of L-member 24 serves to catch and hold the edges of the cases along that portion of the pallet. Another feature of the design of the pallet is that its overall width and depth are slightly less than the total width and depth of the plurality of cases which are stacked thereon. By designing the pallet in this manner the cases may be stacked side by side throughout the various tiers or rows and there is no lost space due to the protrudence of the pallet along the sides or ends of the cases. It is seen that a plurality of such loaded pallets stacked one upon another and side by side will form a compact stable unit which will not shift or become disarranged even though from time to time it is necessary to remove or replace certain of the palleted groups of cases. By providing the center support 26 against which the cases on either side of the pallet are forced, when the pallet is loaded the outer edges of the outer surfaces of the stacked pallets will automatically be in the same plane and thus the cases will not catch one upon the other when it is necessary to remove a loaded pallet from a position between two other pallets. Also, the twist in center support 26 separates the cases on the aisle side of the pallet further than those on the wall side and the plurality of cases thereby have a slight wedge shape which facilitates handling and placement of one loaded pallet between two other pallets, without the tendency of binding or catching on the neighboring tier.

Figure 4:
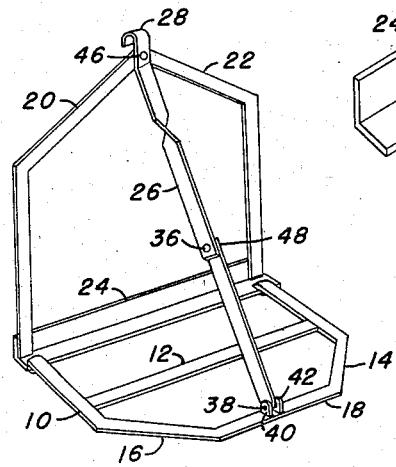
Figure 4 is a perspective view of the pallet showing a form which is collapsible.
Figure 6:
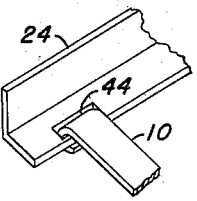
Figure 6 is a detail of the hinge shown in Figure 4.

Figure 4 shows another embodiment of the invention wherein center support 26 is hinged at a point between its ends as by pin or rivet 36. The lower end of support 26 is hinged at its point of attachment to base member 10 by pin 38 extending through parallel spaced ears or tabs 40 and 42 extending upwardly from the leading edge 18 of base 10. Ears 40 and 42 can be separate pieces welded to base 10 or may be cut from base 10 and bent upwardly. The aisle-side termini of base 10 are hinged to cross brace 24. Any type of hinge arrangement may be used for this purpose as long as the hinge is relatively flat so that the cardboard cases are not damaged. In the form shown, a hole or slot 44 is cut in base 24 and the end of base 10 is wrapped around the edge which acts as a pin or hinge. Details of this are shown in Figure 6. The top part of brace 26 is fastened to members 20 and 22 by a screw 46. This screw 46 is preferably rotatably mounted in member 26 so that (Figure 4) when unscrewed from 20 and 22 it remains in the end of 26 so it will not be lost. Hinge or pin 36 in brace 26 is preferably located at a point thereon so that when screw 46 is unscrewed and member 26 is folded the end 48 rests on the flat surface of angle iron 24 and other end of 26, bearing screw 46 comes to rest on ears 40 and 42. This allows back members 20 and 22 to fold onto base member 10 and the entire pallet is easily stacked and stored.

Figure 5:
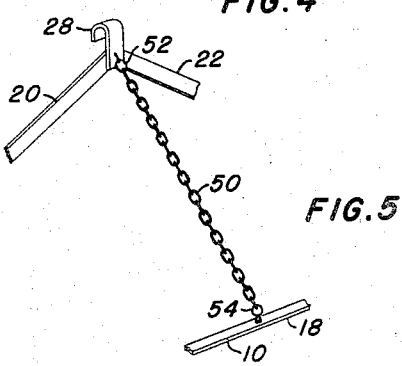
Figure 5 is a partial cut-a-way view showing a chain replacing the hinged center support.

Figure 5 shows another embodiment of Figure 4 in which the brace 26 is replaced by a chain 50 fastened between members 20 and 22 and base 10 by eyes 52 and 54. Chain 50 may be any form of equivalent means such as a cable or rope. In use the pallet shown in Figure 5 is opened and the first case placed thereon may be positioned against members 20 and 22, thus serving to hold the pallet open to receive the remaining cases.

From this description of the invention it is seen that a convenient device for moving and storing cardboard cases and the like is provided. Various modifications can be made without departing from the spirit of the invention. The pallet may be used for cases or packages of any shape and may be fabricated to accommodate any desired number of cases depending on the weight of each, the capacity of the lift truck used and the floor loads allowable on the warehouse space. Modifications in the structure may be made within the scope of the invention. In Figure 1, hook 28 may be affixed to both walls of the pallet and a cross brace like 12 put in between members 20 and 22 so that the pallet can be used in any position. Hook 28 may either be an integral part of brace 26 or attached as a separate member by welding, bolts or rivets. Any form of hinge other than shown in Figures 4 and 6 may be used although the embodiment shown is easy to fabricate, and gives a flat surface on which to lay the first carton. Likewise, in Figure 4 a hook, like 28, may be affixed to the under middle portion of 18 and a cross brace like 12 put in the wall member 20—22 in order that the pallet may be used either way. The only limitations attaching to the invention appear in the appended claims.

What is claimed is:

1. A pallet for supporting and moving a plurality of uniformly sized cases in stacked relationship comprising a flat base member and a flat wall member, said members being perpendicularly joined to each other along one edge, said wall member having a raised portion along the top edge thereof, a flat brace extending from said base member diagonally to said raised portion of said wall member, said diagonal brace being twisted at the end adjacent said raised portion whereby the width thereof is transverse and oblique to the plane of said wall member, said transverse end of said diagonal brace terminating in a hook extending outwardly and downwardly over said raised mid-portion of said top edge of said wall member and said hook being adapted to be engaged by the opposed off-set jaws of the lifting mechanism of a mobile lift truck.

2. A pallet in accordance with claim 1 in which said base member is hinged to a cross member said diagonal brace is centrally hinged and is detachably mounted to said mid-portion of the top edge of said wall member.

References Cited in the file of this patent

UNITED STATES PATENTS

| 959,437 | Martin | May 24, 1910 |
| 1,067,937 | Neumann | July 22, 1913 |
| 1,142,088 | Greene | June 8, 1915 |
| 1,176,225 | Lloyd | Mar. 21, 1916 |
| 1,716,923 | Lindquist | June 11, 1929 |
| 1,799,441 | Raymond | Apr. 7, 1931 |
| 2,194,037 | Thuma | Mar. 19, 1940 |

FOREIGN PATENTS

| 591,407 | Germany | May 17, 1934 |